Figure 4:
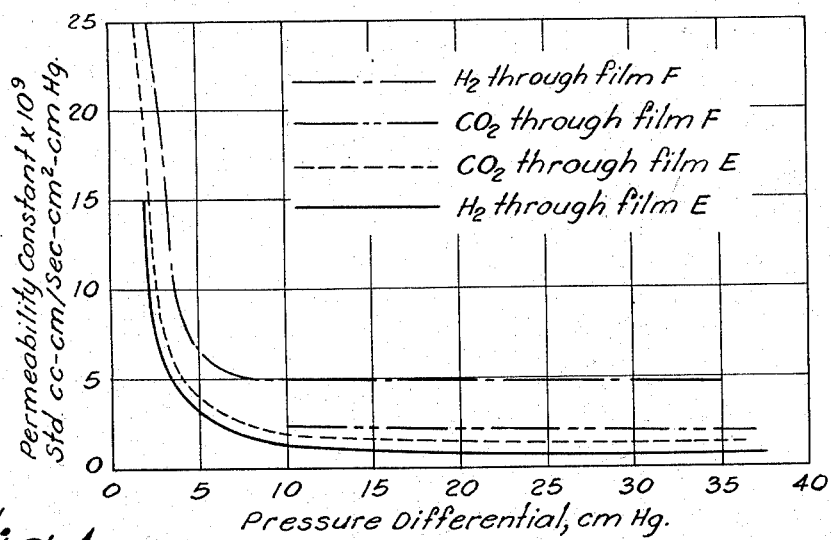

July 14, 1959     B. G. HARPER ET AL     2,894,289
METHOD OF MAKING PERMESELECTIVE MEMBRANES
Filed March 1, 1956     2 Sheets-Sheet 1

INVENTORS.
Billy Gene Harper
John Henry Brown, Jr.
John Clarke Moore
BY *Griswold & Burdick*
ATTORNEYS July 14, 1959     B. G. HARPER ET AL     2,894,289
METHOD OF MAKING PERMESELECTIVE MEMBRANES
Filed March 1, 1956     2 Sheets-Sheet 2

```
┌─────────────────────────────────────────────────┐
│ Dissolving in a common solvent, a film-forming   │
│ material and a different selectively extractable │
│ material to provide a film-forming solution      │
│ of said materials in the common solvent.         │
└─────────────────────────────────────────────────┘
                        │
                        ▼
┌─────────────────────────────────────────────────┐
│ Depositing the film-forming solution             │
│ in a filmiform layer.                            │
└─────────────────────────────────────────────────┘
                        │
                        ▼
┌─────────────────────────────────────────────────┐
│ Removing the common solvent from the             │
│ deposited filmiform layer of said film-          │
│ forming solution to form a continuous            │
│ phase film of said materials in said solution.   │
└─────────────────────────────────────────────────┘
                        │
                        ▼
┌─────────────────────────────────────────────────┐
│ Extracting the extractable material              │
│ from said continuous phase film                  │
│ with a selective solvent therefor.               │
└─────────────────────────────────────────────────┘
                        │
                        ▼
┌─────────────────────────────────────────────────┐
│ Permeselective membrane of film-forming          │
│ material having a plurality of foraminulous      │
│ pores therein.                                   │
└─────────────────────────────────────────────────┘
                        │
                        ▼
┌─────────────────────────────────────────────────┐
│ Optionally, drying the permeselective            │
│ membrane product.                                │
└─────────────────────────────────────────────────┘
```

Fig. 5

INVENTORS.
Billy Gene Harper
John Henry Brown, Jr.
John Clarke Moore
BY Griswold & Burdick
ATTORNEYS

United States Patent Office 2,894,289
Patented July 14, 1959

2,894,289

METHOD OF MAKING PERMESELECTIVE MEMBRANES

Billy Gene Harper, Lake Jackson, John Henry Brown, Jr., Freeport, and John Clarke Moore, Lake Jackson, Tex., assignors to The Dow Chemical Company, Midland, Mich., a corporation of Delaware Application March 1, 1956, Serial No. 568,861

10 Claims. (Cl. 18—57)

This invention relates to a process for producing porous membranes having selective permeability for various substances.

The specific diffusivity potential for particular substances which may be exhibited by porous permeselective membranes, or those possessing characteristics of selective permeability, may advantageously be utilized for various purposes including the separation of gaseous materials and vapors by fractional diffusion techniques. The term, "permeselective membrane," as herein employed, is intended to delineate those porous films and membranes which are essentially physically selective of transfusing or diffusing materials as distinguished from those which may be said to function more through chemical or electrical phenomena or effect. In many instances, however, the membranes which ordinarily have been available for such applications have not provided complete satisfaction and suitable adaptability to warrant their more widespread commercial utilization and exploitation. Frequently, for example, the membranes may exhibit such inefficient or impractically low characteristics of permeability and selectivity that inordinately high pressure differentials or extremely large surface areas, or both, would be necessitated for the accomplishment of desirable results and appreciable productivity in diffusion processes, particularly in gaseous diffusion processes. Furthermore, the poor physical and chemical stability under desired conditions of employment for many of the known membranes precludes their being effectively utilized for a wide variety of materials which might be separable by various techniques, including gaseous diffusion techniques.

It is among the principal objects of the present invention to provide permeselective membranes from readily available materials that are imbued with high degrees of physical and chemical stability and which have significant and efficient characteristics of permeability and selectivity for various materials. It is also among the objects of the invention to provide foraminulate permeselective membranes characterized in having finer and more minute facilities for physical transmission than may otherwise be obtained. It is among the additional objectives of the present invention to provide permeselective membranes that are particularly adapted for employment in various diffusion processes, especially in gaseous diffusion processes. Other objects and advantages of the invention will be more apparent in the following description and specification.

According to the invention, an efficient and stable permeselective membrane having exceptional diffusive selectivity for various substances may be obtained by dissolving at least two different materials in a common solvent, at least one of said materials being a film-forming material, to provide a film-forming solution thereof; forming a continuous phase film of said materials with said film-forming solution; and extracting at least one of the materials from the film with a selective solvent for less than the entire portion of the materials in the film, said selective solvent being substantially non-dissolvent of at least one of the materials constituting said continuous phase film of the film-forming materials in the film. Advantageously, polymeric materials may be employed as the film-forming materials in the practice of the invention. It is usually beneficial to utilize a binary system of polymeric materials in the preparation of the permeselective membranes using a common solvent which is capable of their mutual dissolution and a selective solvent which has no substantial or complete dissolving efficacy on one of the polymeric materials. In many cases, however, one or more of the materials, particularly the extractable material, may have a non-polymeric nature. The process of the present invention whereby the permeselective membranes may be manufactured is schematically illustrated in the manner of a flow sheet diagram in Figure 5 of the accompanying drawing.

Figures 2, 3:
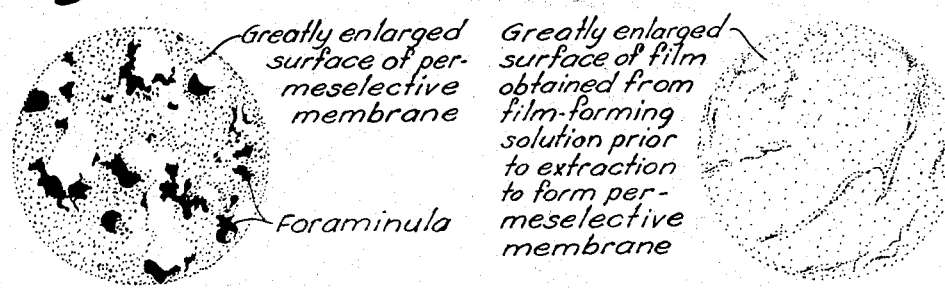
Figure 1:
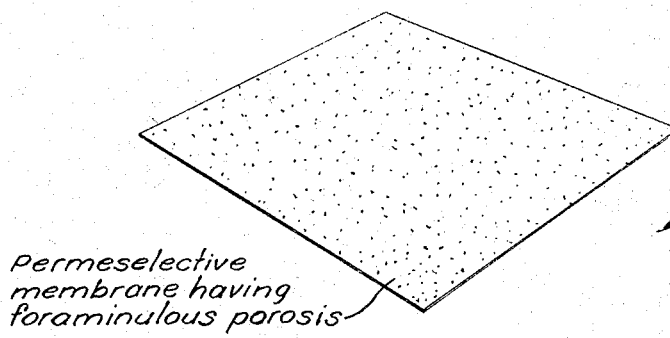

The permeselective membranes which are obtained, as schematically illustrated in Figure 1 of the accompanying drawing, are comprised of a thin, usually pliable and flexible film of polymeric or other material having a plurality of foraminulous pores or exceedingly diminutive intersticial void spaces or passageways in its structure. This is further illustrated by the greatly magnified portion of a permeselective membrane shown in Figure 2 wherein its foraminulous character may be contrasted with the relatively solid film which is obtained prior to extraction as is illustrated, also in great magnification, in Figure 3. The foraminulous passageways in the structure of the permeselective membranes are capable of diffusing various fluid materials, particularly gases and vapors, at independently transfused rates depending to a great extent upon the respective molecular weights or steric configurations, or both, of the gases or vapors. The porosis of the permeselective membranes of the present invention, may, in many instances, constitute as much as 50 percent by volume in the form of foraminules or microforamina in and through the intersticed film. A porosis between about 35 and 40 percent by volume usually facilitates obtaining optimum diffusive and selective characteristics in the membrane. Such films are especially well suited for employment as porous, selective barriers in diffusion processes, including dialysis, osmosis and gaseous diffusion. They can be readily provided in a physically and chemically stable form, depending upon the utilization of particular film-forming materials which is made. They do not require moisture or other forms of plastification for employment and may advantageously be used as a strong, dry film structure.

A great variety of materials can be employed satisfactorily for obtaining permeselective membranes in accordance with the invention. In general, any combination of two or more materials, at least one of which is a film-forming material, which are capable of mutual employment and which are soluble to form a mixed film-forming solution in a common solvent and which are susceptible to selective extraction by selective solvents to leave a membrane comprising porous film-forming material may be employed. It is frequently desirable, as mentioned, to employ at least one polymeric film-forming material and it is usually beneficial to employ different materials to comprise the base membrane-comprising material and the extractable material.

The ratio of materials which may be employed depends not only upon their solubility characteristics and the like in the particular solvent system which is utilized but also upon the characteristics desired in the permeselective membrane. Ordinarily, the porosis of the membrane may be increased by utilizing greater proportions of the extractable material in its preparation. When the extractable material is polymeric in nature the porosity or the size of the foraminulous pores, or both, may often be increased by employing greater molecular weight materials. When other materials, such as soluble crystalline materials and the like, are employed as the extractable material, such properties as crystal shape and size may effect the porosis and foraminulous characteristics of the membrane.

The solvents which are employed will vary with the materials which are utilized. The common solvent should be capable of providing good film-forming solutions of the mixed base and extractable materials and, during formation of a solid and uniform film, should be readily removable by evaporation or other means, such as by extraction with another solvent which has no appreciable effect upon the mixture of materials in the film. The selective solvent should be capable of dissolving a large portion or substantially all of the extractable materials from the film to form the foraminulous membrane while leaving a stable and solid permeselective membrane consisting predominantly or substantially completely of the base materials. In some cases, as indicated, the selective solvent may be suitably employed when it has some solvent effect upon the base material or materials which remain to form the membrane, provided that such effect is not sufficient to destroy the desirable stable and solid microporous film structure which is being prepared. In this connection, the extraction of the extractable material from the film need not be total or complete by the selective solvent since it is frequently possible to prepare suitable permeselective membranes with portions of the extractable material remaining with the base material, which usually are polymeric in nature.

As a general rule, the steps of the membrane preparation process may be carried out under any desired conditions of temperature and pressure which may be suitable for their execution. It is merely necessary to avoid conditions under which the particular materials being processed might tend to become unstable. The time requirements will, of course, vary with the particular materials and conditions being employed for the preparation of given membranes in the conduction of the various steps of the process. The optimum conditions of preparation for various permeselective membranes with various materials will be apparent to those skilled in the art upon consideration of the several factors which may be involved for the preparation of the given membrane. The membranes may be prepared to have any desired thickness to suit the anticipated conditions and requirements of their employment. It frequently may be beneficial to prepare membranes to have a thickness of at least about 0.5 mil in order to provide them with sufficient strength for practical use although, as is apparent, this may vary with the ingredient materials and their respective proportions utilized for a given membrane as well as with the use for which it is intended. Thus, whether a membrane is to be used for osmosis, dialysis or gaseous diffusion will also have a bearing on its optimum thickness.

Although the invention is not intended to be restricted thereto, permeselective membranes having exceptional characteristics for a wide variety of purposes are obtainable when polymeric cellulose ethers such as ethyl cellulose are employed as the base material and relatively low molecular weight polyethylene glycols as the extractabe materials using chloroform as the common solvent for forming the film and water as the selective solvent for the polyethylene glycol.

Thus, the base material may advantageously be comprised of an ethyl cellulose having an ethoxyl content usually-designated "standard," in the range from about 48.0 to 49.5 percent by weight which contains an average of between about 2.46 and 2.58 etherified ethyl substituents per glucose unit and having a viscosity less than about 30 centipoises, as determined in a solvent mixture consisting of about 80 parts by volume of toluene and 20 parts by volume of ethanol. Such a material is available from the Dow Chemical Company under the trade-name "Ethocel." The extractable polyethylene glycol may have a molecular weight, for example, between about 1 and 30 thousand and may be employed with especial advantage in amounts between about one-third and one part by weight for each part by weight of the ethyl cellulose.

Generally, ordinary temperatures and atmospheric pressures can be employed for the preparation of ethyl cellulose permeselective membranes with extractable polyethylene glycols. Suitable film-forming solutions of the mixed polymeric materials in chloroform can usually be prepared within an hour or so at room temperature and under atmospheric pressure. Uniform 1 to 2 mil films can be cast and evaporated to dryness under the same conditions within time periods of several hours. The polyethylene glycol can be conveniently and thoroughly extracted with the formation of an excellent membrane when the selective water solvent is used at a temperature of about 0° C. for a time period of thirty-six hours or so. Permeselective ethyl cellulose membranes having 25 to 50 percent porosity can be easily prepared in this way or when equivalent conditions are substitued and imposed in the various processing steps.

Permeselective ethyl cellulose membranes may also be prepared by employing a non-polymeric extractable material in the film-forming solution. A soluble crystalline inorganic material such as salt may thus be utilized advantageously.

Cellulose nitrate membranes having desirable characteristics of selective permeability may also be prepared according to the invention when it is employed as a polymeric base material with other polyglycol materials as extractable constituents. Thus, an extractable material comprised of a water-soluble, relatively low molecular weight 2-ethylhexyl, methyl diether of a polyglycol consisting of heteric poly-(oxypropylene-oxyethylene) glycol which has about an equimolar proportion of oxypropylene and oxyethylene units in its molecule, may be advantageously utilized with a cellulose nitrate consisting of cellulose tri- and tetra-nitrate as a base polymeric material in a system wherein a mixture of ethyl ether and ethanol is employed as a common solvent and water is utilized for selective extraction purposes.

The invention is further illustrated in and by the following examples.

*Example 1*

A permeselective membrane was prepared in accordance with the present invention and its performance as a selective barrier for gases compared with conventionally obtained ethyl cellulose film membranes. The film, designated F, was prepared by casting a chloroform solution of ethyl cellulose and a polyethylene glycol material on a glass plate and allowing the chloroform to evaporate and leave a solid, uniform residuum film structure of the mixed polymeric materials. The ethyl cellulose employed was the standard grade having a viscosity of about 10 centipoises. The polyethylene glycol had a molecular weight in the neighborhood of about 4,000. The solution of the base and extractable polymeric materials contained about 4.5 percent by weight of ethyl cellulose and 2.0 percent by weight of polyethylene glycol, based on the total weight of the solution, dissolved in the chloroform. The resulting relatively strong and stable film, having a thickness of about 1 mil, was immersed in an ice water bath for about 36 hours to extract the polyethylene glycol and form the permeselective membrane. The film F was then dried for use.

The film F was then tested to determine its permeability constants for substantially pure hydrogen and carbon dioxide gases under varying pressure differentials across the film. The permeability constant is a representative measure of the number of cubic centimeters of gas under standard conditions of 0° C. and one atmosphere of pressure that is passing through each square centimeter of area under a partial pressure across the membrane of one centimeter of mercury in a unit time of one second with a membrane having a film thickness of one centimeter. For purposes of comparison, similar tests were performed on a commercially available sheet of ethyl cellulose film, designated as film E, having a thickness of about 5 mils, which was employed as a membrane. The results are graphically depicted in Figure 4 of the accompanying drawing wherein the permeability constants of the film for the gases are plotted against an applied pressure differential across the film to form the curves which are shown. It was observed that the diffusion rate of carbon dioxide through film E was about 1.5 times as great as the diffusion rate of hydrogen through the same film excepting in the areas of very slight pressure differential. However, while the diffusion rate of carbon dioxide was only slightly greater through film F than through film E, the film F was adapted to pass hydrogen more rapidly than the film E by a factor of about 5.

In another test, not illustrated in the graph, another film of ethyl cellulose was prepared in a manner similar to that employed for film F excepting that the film casting solution contained only about 4.5 percent of the cellulose ether in chloroform. This film, upon testing, displayed essentially the same permeability characteristics as film E.

Example II

Permeselective membranes in the form of sheets were prepared from ethyl cellulose in a manner similar to that which is set forth in Example I. The sheets were tested for their performance as dialysis membranes by being placed in suitable apparatus in such a manner that an ionic solution could be passed over one surface of the membrane in the apparatus while distilled water was flowing over the opposite side of the membrane. The rate of ionic diffusion through the membrane could be determined by testing samples of the distilled water for ion content. For purposes of comparison, a sample of commercial ethyl cellulose film, similar to that employed in the first example, was similarly tested. The rate of hydrogen and choride diffusion from a 0.1 N solution of hydrogen chloride in water through the permeselective membrane to the distilled water was found to be about 0.00002 moles per minute per square centimeter of the membrane per 0.001 inch of its thickness. There was no evidence of any diffusion through the commercially available ethyl cellulose film.

Example III

A permeselective membrane was prepared in the form of a tube (having a closed end) from ethyl cellulose, using a film-forming solution similar to that described in the first example and a technique adapted therefrom. The tube had a diameter of about 1 inch and a height of about 5 inches. It was filled with a saline solution and immersed to a depth of about 3 inches in a bath of distilled water. Within a short period of time after its immersion, the level of the liquid inside the tube had risen about an inch higher than the level of the distilled water bath. Periodic testing of the liquid outside the tube disclosed that the salt was slowly diffusing into the distilled water bath. During this process, in which there were required about 5 days for an equilibrium condition to develop, the liquid level inside the tube returned to an equal height with the level in the bath.

Example IV

About 20 grams of the same cellulose ether as was employed in Example I and 15 grams of calcium nitrate were dissolved in about 400 grams of ethanol. A thin layer of the resulting film-forming solution was spread on a clean glass plate and dried to a uniform white film in several hours. The film, remaining attached to the glass, was placed in a water bath for a several hour period during which time it assumed a grey coloration. The film was removed from the water and permitted to dry. It was then tested in the manner described in Example I for permeability to hydrogen gas. The rate of hydrogen diffusion through the film was found to be about 100 times as great as that of the commercially available ethyl cellulose film tested in the first example.

Similar results are obtainable with permeselective membranes prepared in accordance with the invention from ethyl cellulose (or other cellulose ethers) and a polyethylene glycol having a molecular weight of about 9,000; cellulose nitrate and a water-soluble 2-ethylhexyl methyl diether of a heteric poly-(oxypropylene-oxyethylene) glycol; and other desired combinations of various base and extractable materials including, for example, polyvinylpyrrolidone, polyacrylic acid, polyacrylamide, and the like, and other salts and non-polymeric extractable materials.

Certain changes and modifications can be readily entered into in the practice of the present invention without substantially departing from its intended spirit and scope. It is, therefore, to be fully understood that all of the foregoing description and specification is to be taken as being merely illustrative of certain embodiments of the invention which is not intended to be limited or restricted thereby. Rather, the invention is to be interpreted and construed in the light of what is set forth and defined in the hereto appended claims.

What is claimed is:

1. A process for the preparation of permeselective membranes which comprises dissolving at least two different materials, at least one of said materials being a film-forming material, in a common solvent to provide a film-forming solution thereof; depositing said solution in a filmiform layer; removing said common solvent from the filmiform layer of said film-forming solution to form a continuous phase film of said materials and extracting at least one of the materials from the film with a selective solvent for less than all the materials in the film, said selective solvent being substantially non-dissolvent of the film-forming materials constituting said continuous phase film.

2. A process in accordance with the process set forth in claim 1 wherein at least one of the film-forming materials is a film-forming polymeric material.

3. A process in accordance with the process set forth in claim 1 wherein a binary system of polymeric materials is employed.

4. A process for the preparation of permeselective membranes which comprises dissolving a base, film-forming, polymeric material and an extractable material in a common solvent to provide a film-forming solution thereof; depositing said solution in a filmiform layer; removing said common solvent from said filmiform layer of said film-forming solution to form a film of said materials; and extracting the extractable material from the film with a selective solvent therefore; said selective solvent being substantially non-dissolvent of said base polymeric material.

5. A process in accordance with the process set forth in claim 4 wherein the extractable material is a polymeric material.

6. A process in accordance with the process set forth in claim 4 and including, as a final step, the step of drying the extracted film.

7. A process in accordance with the process set forth in claim 4 wherein the base polymeric material is ethyl cellulose and the extractable material is a polymeric material comprising a polyethylene glycol.

8. A process in accordance with the process set forth in claim 7 wherein between about 1 and 3 parts by weight of the ethyl cellulose is employed for each part by weight of the polyethylene glycol.

9. A process in accordance with the process set forth in claim 4 wherein the base polymeric material is cellulose nitrate and the extractable material is a polymeric material comprising a relatively low molecular weight 2-ethylhexyl, methyl diether of a polyglycol consisting of heteric poly(oxypropylene-oxyethylene) glycol.

10. A process in accordance with the process set forth in claim 4 wherein the base polymeric material is ethyl cellulose and the extractable material comprises an inorganic, crystalline material.

References Cited in the file of this patent

UNITED STATES PATENTS

| | | |
|---|---|---|
| 2,490,178 | Kroon | Dec. 6, 1949 |
| 2,503,139 | Soler | Apr. 4, 1950 |
| 2,504,208 | Locke et al. | Apr. 18, 1950 |
| 2,542,527 | Honey et al. | Feb. 20, 1951 |
| 2,563,644 | Drisch et al. | Aug. 7, 1951 |
| 2,700,694 | Fernald | Jan. 25, 1955 |
| 2,846,727 | Bechtold | Aug. 12, 1958 |